(12) United States Patent
Doyle

(10) Patent No.: US 11,979,279 B1
(45) Date of Patent: May 7, 2024

(54) ALLOCATED EXECUTION TIME ADJUSTMENT FOR SECURE DEVICE PROVISIONING

(71) Applicant: Arista Networks, Inc., Santa Clara, CA (US)

(72) Inventor: Eamon Doyle, Dublin (IE)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/446,854

(22) Filed: Aug. 9, 2023

(51) Int. Cl.
*G06F 15/177* (2006.01)
*H04L 9/40* (2022.01)
*H04L 41/0806* (2022.01)

(52) U.S. Cl.
CPC ...... *H04L 41/0806* (2013.01); *H04L 63/0428* (2013.01)

(58) Field of Classification Search
CPC .................. H04L 41/0806; H04L 63/0428
See application file for complete search history.

(56) References Cited

U.S. PATENT DOCUMENTS

| | | | | |
|---|---|---|---|---|
| 7,266,595 | B1 * | 9/2007 | Black | H04L 41/0806 715/744 |
| 8,680,987 | B1 * | 3/2014 | Okmyanskiy | G01S 19/05 340/426.19 |
| 8,752,161 | B1 * | 6/2014 | Thai | H04L 65/1045 370/395.2 |
| 10,230,693 | B2 * | 3/2019 | Dawson | H04L 63/0428 |
| 10,785,810 | B2 * | 9/2020 | Pau | H04L 41/0806 |
| 11,574,044 | B1 * | 2/2023 | Chen | G06F 21/45 |
| 11,574,357 | B1 * | 2/2023 | Rugel | G06Q 30/0641 |
| 2002/0116485 | A1 * | 8/2002 | Black | H04L 41/0806 709/227 |
| 2016/0295350 | A1 * | 10/2016 | Alanen | H04W 74/002 |
| 2017/0163607 | A1 * | 6/2017 | Skuratovich | H04L 63/0428 |
| 2022/0366431 | A1 * | 11/2022 | Viera Rodriguez | G06Q 40/02 |
| 2023/0132077 | A1 * | 4/2023 | Strater | H04L 41/12 370/329 |
| 2023/0269250 | A1 * | 8/2023 | Canpolat | H04L 63/0823 726/6 |

FOREIGN PATENT DOCUMENTS

| | | | | |
|---|---|---|---|---|
| GB | 2525773 | * | 11/2015 | G06F 9/44505 |
| JP | 2011109537 A | * | 6/2011 | H04M 1/72412 |
| JP | 2023163368 A | * | 11/2023 | H04N 1/00 |
| KR | 20140020179 A | * | 2/2014 | H04W 92/18 |
| KR | 101692964 B1 | * | 1/2017 | G06F 9/3009 |

OTHER PUBLICATIONS

K. Watsen et al., Secure Zero Touch Provisioning (SZTP), Standards Track, Apr. 2019, pp. 1-87, RFC Editor, United States.

* cited by examiner

*Primary Examiner* — Richard G Keehn
(74) *Attorney, Agent, or Firm* — Treyz Law Group, P.C.; Tianyi He

(57) ABSTRACT

A network device may receive one or more configuration scripts as part of provisioning information in a secure device provisioning operation. When executing a particular configuration script, the network device may maintain a timeout value indicative of an allocated time for completion of the execution of the configuration script. The network device may update the timeout value based on an indication in the configuration script.

20 Claims, 6 Drawing Sheets

ALLOCATED EXECUTION TIME ADJUSTMENT FOR SECURE DEVICE PROVISIONING

BACKGROUND

This relates to network devices, and more particularly, to un-provisioned network devices.

Provisioning a network device for use can often take excessive effort. It may generally be desirable to simplify the provisioning process for network devices while still properly configuring the network devices for operation. As an example, an initially un-provisioned network device may be configured to perform a self-provisioning operation based on secure zero touch provisioning to simplify the provisioning process.

DETAILED DESCRIPTION

Figure 1:
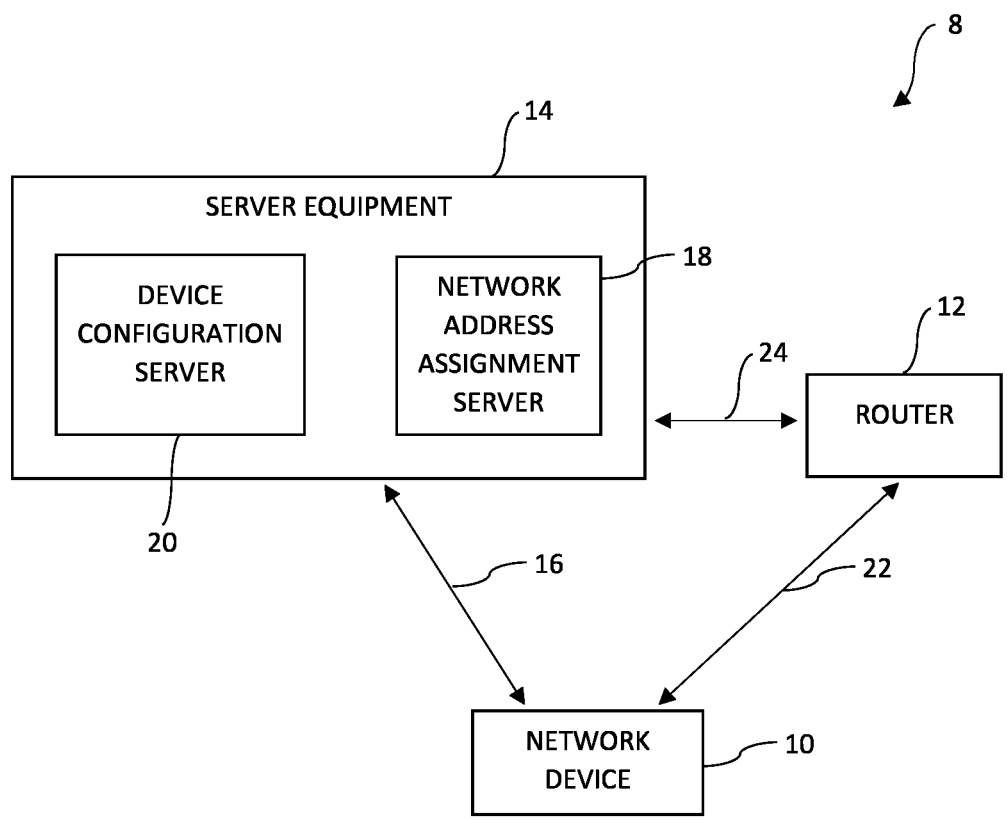
FIG. 1 is a diagram of an illustrative network to which an initially un-provisioned network device is coupled in accordance with some embodiments.

A network can convey network traffic (e.g., in the form of packets, frames, etc.) between host devices. To properly route and forward the network traffic, the network can include a number of network devices configured with networking data such as forwarding decision data, routing decision data, network policy information, etc.

Network devices typically require provisioning and the reception of configuration data (e.g., networking data) to be operational within the network. To simplify the process of provisioning or configuring a network device for operation, the network device may initiate its own provisioning operation (sometimes referred to as a self-provisioning operation) at least in part to obtain its network address such as its IPv6 (Internet Protocol version 6) address. The network device may receive its network address from a network address assignment server (e.g., a server implementing DHCP (Dynamic Host Configuration Protocol) such as DHCPv6). The network device may further receive a network address (e.g., a Uniform Resource Locator or web address) of a bootstrap server (e.g., a server that stores information based on which the network device can be provisioned or bootstrapped). The network device may communicate with the bootstrap server to receive the provisioning information (sometimes referred to as bootstrapping data or artifacts).

In some illustrative configurations described herein as an example, the bootstrap server and the network device may be configured to perform secure zero touch provisioning for the network device. In other words, the provisioning information (e.g., the artifacts therein such as onboarding information, an ownership voucher, and an owner certificate) may be obtained securely from the bootstrap server by the network device. As examples, the secure nature of obtaining the provisioning information may be implemented by the provisioning information being encrypted, the provisioning information being signed (by an owner key or certificate) and subsequently validated, the connection between the bootstrap server and the network device being an encrypted communication channel, the bootstrap server being a bootstrap data source trusted by the network device, and/or other measures, e.g., those as described in RFC (Request for Comments) 8572.

If desired, the bootstrap server and the network device may be configured to perform other types of device provisioning (e.g., zero touch provisioning or other types of device self-provisioning different than secure zero touch provisioning). If desired, the network device may obtain the provisioning information from other sources such as a storage device removably coupled to the network device, a Domain Name System (DNS) server, and/or the DHCP server (e.g., may receive onboarding information and/or redirect information that redirects the network device to a source of onboarding information from any of these sources).

In some configuration described herein as an example, onboarding information in the provisioning information may include one or more processor-executable files (sometimes referred to herein simply as executable files or executable configuration files). These processor executable files may include scripts (sometimes referred to herein as script-based executable files) and other (non-script-based) processor-executable files (e.g., compiled (binary) executable files). In other words, as described herein, executable files encompass executable files based on any level programming languages (e.g., executable files that are translated into machine code prior to being executable by the processor and/or executable files that have been compiled and is therefore directly executable by the processor).

Configurations in which one or more configuration scripts in the onboarding information includes a pre-configuration script and/or a post-configuration script (e.g., in a conveyed information artifact) intended to be executed by the network device as part of the self-provisioning operation are sometimes described herein as an illustrative example. If desired, one or more (e.g., both) of these scripts may instead be other types of executable configuration files (e.g., compiled executable configuration files in machine code).

Regardless of the type (e.g., format) of the executable file, the executable file may include software instructions (programming code) that, when executed by the processing circuitry of the network device, cause the network device to perform operations that configure its hardware components (e.g., interface circuitry, packet processor(s), switching fabric, memory circuitry, control plane processing circuitry), its software features (e.g., operating software, network routing capabilities, traffic forwarding capabilities, etc.), and/or other components of the network devices in preparation for performing the desired set of networking operations (e.g., traffic routing, routing protocols, traffic forwarding, etc.) after being fully provisioned.

To ensure that the execution of an executable file terminates in a timely manner (whether or not the execution is successfully completed), the network device may set a timer to allocate a time (an amount of time) within which execution of the executable file should complete. While the allocation of time in this manner may be helpful to prevent a prolonged execution of the executable file in a scenario where execution of the executable file has encountered problems and cannot be completed, the allocation of time in this manner may be counterproductive in a scenario where the executable file is taking longer than usual as part of normal execution. In the latter scenario, the allocation of the amount of time for file execution may prevent the file execution from successfully completing, even when there are no issues with the execution.

Accordingly, it may be desirable to provide a mechanism by which the allocated amount of time may be adjusted to accommodate execution of the executable file (e.g., execution of configuration scripts or compiled binary executable files that take relatively large amounts of time). An illustrative networking system in which a network device is configured to provide the mechanism by which the allocated execution time may be adjusted is shown in FIG. 1.

FIG. 1 shows an illustrative network (portion) 8 which may be of any suitable scope and/or form part of a larger network of any suitable scope. As examples, network 8 may include, be, or form part of one or more local segments, one or more local subnets, one or more local area networks (LANs), one or more campus area networks, a wide area network, etc. Network 8 may include any suitable number of different network devices that connect corresponding host devices of network 8 to one another. At least some of these network devices may be connected by one or more wired technologies or standards such as Ethernet (e.g., using copper cables and/or fiber optic cables), thereby forming a wired network portion. If desired, network 8 may also include a wireless network portion coupled to the wired network portion. If desired, network 8 may include or be coupled to internet service provider networks (e.g., the Internet) or other public service provider networks, private service provider networks (e.g., multiprotocol label switching (MPLS) networks), and/or other types of networks such as telecommunication service provider networks (e.g., a cellular network based on one or more standards as described in the 3GPP specifications such as GSM, UMTS, LTE, 5G, etc.).

In general, network devices in network 8 can include any number of switches (e.g., multi-layer switches), bridges, routers, gateways, hubs, repeaters, firewalls, wireless access points, network devices serving other networking functions, network devices that include the functionality of two or more of these devices, management devices that control the operation of one or more of these network devices, and/or other types of network devices.

In the example of FIG. 1, the network devices of network 8 includes at least network device 10, such as a multi-layer switch or another type of network device, and router 12. Network 8 may also include one or more host devices or host equipment such as server equipment 14. Configurations in which network device 10 is an un-provisioned network device (e.g., a not fully provisioned or configured network device) when initially coupled or connected to other elements of network 8 are sometimes described herein as an illustrative example.

In these configurations, network device 10 may communicate with different portions of server equipment 14 via one or more communication paths 16 in an attempt to perform a network device provisioning operation that provisions and configures device 10 itself for operation. In particular, network device 10 may first communicate with a network address assignment server 18 implemented on server equipment 14 (e.g., a DHCP server such as a DHCPv6 (Dynamic Host Configuration Protocol version 6) server, a server that uses a variation of DHCP, a server that is compliant with only some portions of DHCP, etc.) to obtain a network address for network device 10. After obtaining its network address, network device 10 may then communicate with a device configuration server 20 implemented on server equipment 14 (sometimes referred to as a bootstrap server 20) to obtain configuration data, configuration instructions such as executable scripts or other types of executable files, and/or generally configuration files (collectively referred to as provisioning information or bootstrapping data).

Network device 10 may be considered fully provisioned and ready to perform network operations (e.g., traffic routing, routing protocols, traffic forwarding, etc.) after successfully executing the obtained configuration instructions, storing the obtained configuration data, and/or generally processing the obtained configuration files, as examples. While both shown in FIG. 1 to be within server equipment 14, servers 18 and 20 may be implemented on distinct and separate pieces of server computing equipment (e.g., on different processing circuitry or processors, on the same or different server racks) at server equipment 14 or on shared computing equipment at server equipment 14. Servers 18 and 20 may be implemented on different network portions at different sites or may be implemented at the same site.

Before, when, and/or after communicating with server equipment 14 as part of the device provisioning operation, network device 10 may be in communication with router 12 via one or more communication paths 22. Router 12 may be a router on the same local segment or subnet as network device 10 and server equipment 14, an edge router or gateway, a core router, a virtual router implemented on server equipment, or generally a router implemented in any suitable manner at any suitable location within network 8. Router 12 may be communicatively coupled to server equipment 14 via one or more communication paths 24.

Communication paths 16, 22, and 24 may be implemented using network paths of network 8. These network paths may include direct cable connections with or without intervening network devices. In other words, each path 16, each path 22, each path 24 may span across portions of network 8 (e.g., one or more network devices therein) to provide the connectivity illustrated in FIG. 1. While shown as separate paths, paths 16, 22, and 24 may include paths or path portions that overlap one another.

In one illustrative arrangement, a given path 16 may be implemented by paths 22 and 24 and intervening router 12. In this arrangement, network device 10 may lack a direct connection to server equipment 14 and any connection between network device 10 and server equipment 14 includes router 12 (e.g., serving as a relay device). In particular, router 12 may contain a relay agent executing on the processing circuitry on router 12 to perform relaying of address assignment messages (e.g., DHCP request and reply messages) for network device 10 and server equipment 14. This relaying of DHCP messages and/or other types of messages occurs prior to device 10 having or being assigned a network address and thus will differ from normal packet forwarding (e.g., forwarding of packets that identify the network address of device 10).

If desired, other routers and/or other network devices (e.g., in addition to router 12) may also serve as relay devices to relay DHCP messages and/or other messages between device 10 and server equipment 14. As an illustrative example, an intervening router coupled along path 24 (e.g., between router 12 and server equipment 14) may also contain a relay agent executing on its processing circuitry. This intervening router along path 24 and router 12 may collectively relay the DHCP messages and/or other messages. In general, any number of intervening (relay) devices (e.g., zero, one, two, etc.) at any suitable locations (e.g., along path 16, path 22, and/or path 24) may be involved in the conveyance of messages between network device 10 and server equipment 14 (e.g., between device 10 and server 18, between device 10 and server 20, etc.).

Figure 2:
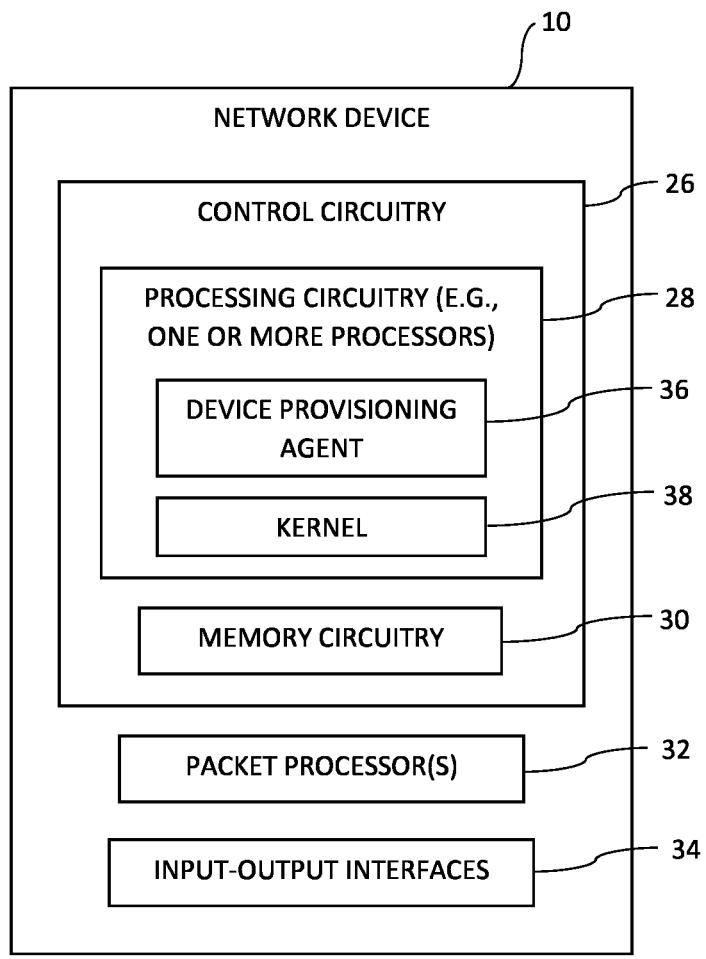
FIG. 2 is a diagram of an illustrative network device in accordance with some embodiments.

FIG. 2 is a diagram of an illustrative network device such as network device 10 in FIG. 1. In some configurations described herein as an illustrative example, network device 10 may be an un-provisioned multi-layer switch or other type of network device that automatically initiates a device provisioning operation to provision itself after being introduced to network 8 in FIG. 1 (e.g., after being communicatively coupled to components of network 8 such as router 12 and/or server equipment 14).

As shown in FIG. 2, network device 10 may include control circuitry 26 having processing circuitry 28 and memory circuitry 30, one or more packet processors 32, and input-output interfaces 34 disposed within a housing of network device 10. The housing may include an exterior cover (e.g., a plastic exterior shell, a metal exterior shell, or an exterior shell formed from other rigid or semi-rigid materials) and/or a supporting substrate that provide structural support and protection for the components of network device 10 mounted within and/or on the housing. In one illustrative arrangement, network device 10 may be or form part of a modular network device system (e.g., a modular switch system having removably coupled modules usable to flexibly expand characteristics and capabilities of the modular switch system such as to increase ports, provide specialized functionalities, etc.). In another illustrative arrangement, network device 10 may be a fixed-configuration network device (e.g., a fixed-configuration switch having a fixed number of ports and/or a fixed hardware configuration)

Processing circuitry 28 may include one or more processors or processing units based on central processing units (CPUs), based on graphics processing units (GPUs), based on microprocessors, based on general-purpose processors, based on host processors, based on coprocessors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Processing circuitry 28 may run (e.g., execute) a network device operating system and/or other software/firmware that is stored on memory circuitry 30. Memory circuitry 30 may include one or more non-transitory (tangible) computer-readable storage media that stores the operating system software and/or any other software code, sometimes referred to as program instructions, software, data, instructions, or code. As an example, the network device self-provisioning operations described herein may be stored as (software) instructions on the one or more non-transitory computer-readable storage media (e.g., in portion(s) of memory circuitry 30 in network device 10). The corresponding processing circuitry (e.g., one or more processors of processing circuitry 28 in network device 10) may process or execute the respective instructions to perform the corresponding provisioning operations. Memory circuitry 30 may be implemented using non-volatile memory (e.g., flash memory or other electrically-programmable read-only memory configured to form a solid-state drive), volatile memory (e.g., static or dynamic random-access memory), hard disk drive storage, removable storage devices (e.g., storage device removably coupled to device 10), and/or other storage circuitry. Processing circuitry 28 and memory circuitry 30 as described above may sometimes be referred to collectively as control circuitry 26 (e.g., implementing a control plane of network device 10).

As other illustrative operations in addition to device provisioning operations, processing circuitry 28 may execute network device control plane software such as operating system software, routing policy management software, routing protocol agents or processes, routing information base agents, and other control software, may be used to support the operation of protocol clients and/or servers (e.g., to form some or all of a communications protocol stack such as the TCP/IP stack), may be used to support the operation of packet processor(s) 32, may store packet forwarding information, may execute packet processing software, and/or may execute other software instructions that control the functions of network device 10 and the other components therein. Some of these operations such as those associated with routing policy management software, routing protocol agents or processes, routing information base agents, and packet processing software may occur after the device provisioning operation has been successfully completed.

Packet processor(s) 32 may be used to implement a data plane or forwarding plane of network device 10. Packet processor(s) 32 may include one or more processors or processing units based on central processing units (CPUs), based on graphics processing units (GPUs), based on microprocessors, based on general-purpose processors, based on host processors, based on coprocessors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Packet processor 32 may receive incoming network traffic via input-output interfaces 34, parse and analyze the received network traffic, process the network traffic based on packet forwarding decision data (e.g., in a forwarding information base) and/or in accordance with network protocol(s) or other forwarding policy, and forward (or drop) the network traffic accordingly. The packet forwarding decision data may be stored on a portion of memory circuitry 30 and/or other memory circuitry integrated as part of or separate from packet processor 32.

Input-output interfaces 34 may include different types of communication interfaces such as Ethernet interfaces (e.g., one or more Ethernet ports), optical interfaces, a Bluetooth interface, a Wi-Fi interface, and/or other networking interfaces for connecting network device 10 to the Internet, a local area network, a wide area network, a mobile network, and generally other network device(s), peripheral devices, and other computing equipment (e.g., host equipment such as server equipment, user equipment, etc.). As an example, input-output interfaces 34 may include ports or sockets to which corresponding mating connectors of external components can be physically coupled and electrically connected. Ports may have different form-factors to accommodate different cables, different modules, different devices, or generally different external equipment.

In configurations in which network device 10 is an initially un-provisioned network device, processing circuitry 28 on network device 10 may execute a device provisioning agent 36 (sometimes referred to herein as a device provisioning process 36) that helps manage and facilitate the device self-provisioning operation described herein after the initially un-provisioned device 10 is supplied with power and is communicatively coupled to router 12 and/or server equipment 14 (e.g., by having a network connection). If desired, this provisioning operation may be initiated automatically by executing agent 36 based on one or more criteria being met. The one or more criteria can include network device 10 being connected to a power source, network device 10 being coupled to one or more elements of network 8, network device 10 lacking an initial configuration, network device 10 receiving one or more user inputs such as the pressing of a button, the providing of a key or other security element, or generally any specified input via a user interface, and/or other suitable provisioning criteria. Configured in this manner, network device 10 may sometimes be referred to herein as a network device configured for secure zero touch provisioning, zero touch provisioning, one touch provisioning, or minimal touch provisioning.

Processing circuitry 28 may also execute threads or tasks for a kernel such as kernel 38. Kernel 38 may, among numerous other functions, implement communication interfaces based on communication protocols (e.g., transport layer protocols, network layer protocols, data link layer protocols, etc.) and form corresponding communication sockets, thereby implementing a communication protocol stack (e.g., a TCP/IP stack) with which network device 10 can communicate with external equipment.

As part of the device provisioning operation, device 10 (e.g., device provisioning agent 36) may obtain device network address information such as the network (e.g., IP or more specifically IPv6) address of network device 10 from network address assignment server 18. Kernel 38 may receive the network address information to form one or more network layer interfaces (e.g., one or more IPv6 interfaces) based on the received device network address information for device 10. Device provisioning agent 36 may subsequently communicate with device configuration server 20 to obtain configuration files (e.g., configuration scripts, configuration data such as routing and forwarding decision data, network policy information, etc., and generally other provisioning information or bootstrapping data) via the network interfaces established by kernel 38.

Processing circuitry 28 may execute device provisioning agent 36 and kernel 38 by executing software instructions stored on memory circuitry 30. While device provisioning agent 36 and kernel 38 are described to perform respective parts of the device provisioning operation for provisioning device 10, this is merely illustrative. Processing circuitry 28 may be organized in any suitable manner (e.g., to have any other agents or processes instead of or in addition to device provisioning agent 36 and/or kernel 38) to perform each part of the device provisioning operation. Accordingly, processing circuitry 28 may sometimes be described herein to perform the device provisioning operation instead of specifically referring to the one or more agents, processes, and/or kernel executed by processing circuitry 28.

Figure 3:
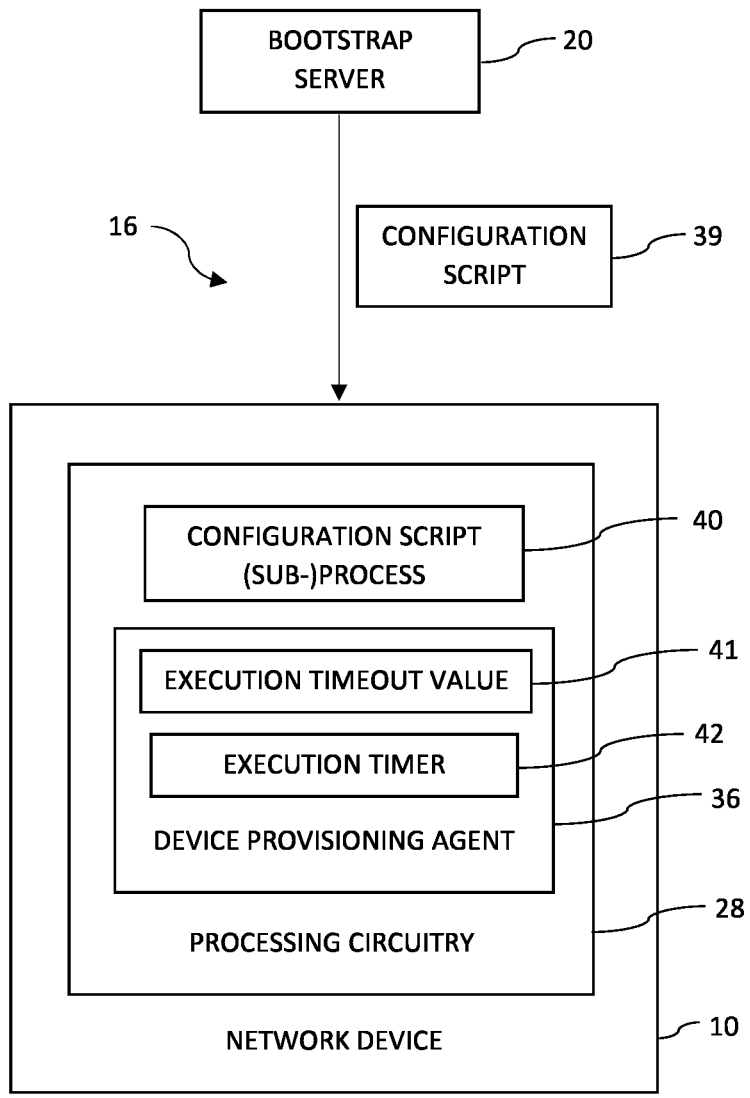
FIG. 3 is a diagram of illustrative operations performed by an un-provisioned network device to perform device self-provisioning in accordance with some embodiments.

FIG. 3 is a diagram of illustrative operations performed by a network device for device provisioning (e.g., secure zero touch provisioning). As shown in FIG. 3, network device 10 may communicate with bootstrap server 20 (or any other suitable sources for provisioning information) via a communication path 16. In particular, network device 10 may obtain provisioning information containing one or more configuration scripts 39 and/or other types of executable files (e.g., compiled binary executable files) from bootstrap server 20.

In some illustrative configurations described herein as an example, the obtained provisioning information may include onboarding information, an ownership voucher (e.g., that associates a device such as device 10 to an owner), and an owner certificate (e.g., an X.509 public key certificate that binds the owner (identity) to a public key, which a device such as device 10 can use to validate a signed version of the onboarding information). The onboarding information may include configuration data and one or more configuration scripts 39 such as a pre-configuration script and/or a post-configuration script (or other types of executable files).

The onboarding information (e.g., scripts 39 therein) received from bootstrap server 20 via path 16 may be obtained securely (e.g., as part of secure zero touch provisioning). As an example, the obtained onboarding information may be signed using an owner certificate (e.g., may be a signed version of the onboarding information) and device 10 may validate the signed version of the onboarding information prior to use. In particular, device 10 may authenticate the ownership voucher obtained as part of the provisioning information by validating the signature of the ownership voucher based on one of the pre-configured (stored) trust anchors (e.g., using additional intermediate certificate(s) associated with the ownership voucher as applicable). Upon successful authentication of the ownership voucher, device 10 may extract a certificate (e.g., an X.509 certificate) from the ownership voucher. Device 10 may further validate the owner certificate based on the extracted certificate (e.g., by performing an X.509 certificate path verification to the extracted certificate). Device 10 may then verify that the signed version of the onboarding information was signed by the validated owner certificate.

If desired, the onboarding information (whether signed or not) may be considered to be securely obtained when the source of the onboarding information is trusted by device 10. In particular, the source of the onboarding information (e.g., bootstrap server 20) may be trusted by device 10 because device 10 maintains (on memory circuitry 30) a list of trusted bootstrap servers that includes bootstrap server 20 and/or because device 10 maintains (on memory circuitry 30) a list of trust anchor certificates for bootstrap servers that establishes trust for bootstrap server 20. If desired, in addition to or instead of the onboarding information being signed and/or being from a trusted source, the onboarding information may be encrypted when received by network device 10 from bootstrap server 20 over path 16.

Network device 10 may validate and/or decode (e.g., decrypt) the received version of onboarding information and the one or more scripts 39 (or other types of executable files) therein prior to use. After obtaining an executable (e.g., validated and decoded) version of a given configuration script 39, processing circuitry 28 may be configured to process and execute configuration script 39 (or another type of executable file) as part of process 40 (sometimes referred to herein as configuration script process 40 or configuration script execution process 40 when used to execute script 39). As an example, processing circuitry 28 may execute configuration script 39 as a sub-process 40 of main device provisioning process 36.

To manage the execution of configuration script 39 in process 40, processing circuitry 28 (e.g., as part of device provisioning agent 36) may maintain an execution timeout value 41 having a fixed value indicative of an allocated (amount of) time for completing the execution of configuration script 39 (or another type of executable file) in process 40. As examples, timeout value 41 may be a (default) value less than 1 hour, less than 20 minutes, less than 10 minutes, and/or greater than 1 minute such as a value of 30 minutes, 15 minutes, 5 minutes, etc. If desired, execution of different executable files (e.g., a pre-configuration script, a post-configuration script, a script executable file, and/or a compiled binary executable file) may have different default timeout values (e.g., may be allocated different amounts of time for completion).

To track the elapsed (amount of) time since the beginning of the execution of configuration script 39 (or another type of executable file) in process 40, processing circuitry 28 (e.g., as part of device provisioning agent 36) may maintain an execution timer 42 (sometimes referred to as script execution timer 42 when process 40 executes a script executable file. Timer 42 may track an amount of time that has elapsed since the beginning of configuration script execution (e.g., since the start of process 40). Device provisioning agent 36 may periodically compare (e.g., with any suitable periodicity such as every second, every two seconds, etc.) the current value of execution timer 42 (e.g., a current elapsed time) to the fixed execution timeout value 41 to determine whether or not the current execution time of script 39 (or another type of executable file) in process 40 has exceeded the allocated amount of time indicated by timeout value 41.

Upon completion of the execution (prior to the current elapsed time reaching the execution timeout value 41), device provisioning agent 36 may receive an indication of the completion from process 40 and may proceed with a next step of the provisioning process or may conclude the provisioning process, if complete. However, if the execution in process 40 has not been completed prior to the current elapsed time reaching execution timeout value 41 (e.g., a comparison of the current value of timer 42 to timeout value 41 indicating that the currently elapsed time value is greater than execution timeout value 41), processing circuitry 28 may terminate process 40 and restart the provisioning process.

In configurations described herein as an illustrative example, restarting the provisioning process may entail deleting all provisioning information previously downloaded from server 20, restoring any device configuration state to a state prior to downloading the provisioning information from server 20, and restarting communication with a DHCP server and subsequently re-downloading provisioning information from a bootstrap server. In other illustrative configurations, restarting the provisioning process may entail simply restarting the execution of script 39 (or another type of executable file) and/or taking other suitable actions. If desired, network device 10 may also, in addition to restarting the provisioning process, send one or more messages to a network administrator indicating a failure to complete the execution of the executable file, a failure to complete a current provisioning process, and/or other information usable to troubleshoot the failure(s).

The use of execution timer 42 and execution timeout value 41 (e.g., the periodic comparisons between the running value of timer 42 and fixed execution timeout value 41) to monitor the execution of the executable file in process 40 may be helpful in ensuring that feedback is provided (e.g., to a system facilitating device provisioning, to device provisioning agent 36, and/or to a network administrator) in a timely manner regardless of whether the execution of the executable file is successful or not. In such a manner, any issues with device provisioning may be promptly noticed and addressed (e.g., by re-initiating another instance of device provisioning), rather than having the execution of the executable file take a prolonged period of time even when experiencing issues that cause the execution to be unable to be completed.

While the use of execution timer 42 and execution timeout value 41 in the above-mentioned manner is helpful, it may also be counterproductive in some scenarios. In particular, because different device owners (e.g., different organizations) may use the same type of device 10 in different manners, the corresponding configuration scripts (or executable files in another format such as a binary format) executing on the same type of device 10 as part of device provisioning may vary in function, complexity, etc., to suit the needs to the particular device owner. As such, it may be difficult to provide a default execution timeout value that is satisfactory for all types of executable configuration files (e.g., configurations scripts or executable files in another format) desired by different device owners.

Accordingly, it may be desirable to provide a mechanism to adjust execution timeout value 41 (e.g., from a default value to one or more customized values) to meet the needs of different executable configuration files (e.g., configuration scripts of different functions, complexities, etc., or generally executable files having different execution time requirements).

Configurations in which one or more configuration scripts such as configuration script 39 are executed, in which corresponding script execution timeout value(s) 41 are maintained to manage the execution of the configuration script, and in which the script execution timeout value(s) 41 are adjusted by the mechanism described herein are sometimes described herein as an illustrative example. In particular, script executable files (e.g., configuration scripts 39 such as a pre-configuration script and a post-configuration script) are one of many illustrative types of processor-executable files. If desired, the embodiments described herein may generally be applied to any desired executable files (e.g., files other than those containing scripts such as compiled binary executable files or other non-script-based executable files). In other words, the mechanism described herein may be used to adjust the corresponding execution timeout values maintained for the execution of these (non-script-based) executable files. These (non-script-based) executable files may similarly be obtained by the network device (e.g., network device 10) as part of provisioning information, as part of a secure zero touch provisioning operation, and/or from a bootstrap server. In other arrangements, these executable files may be obtained by the network device from other sources and/or as part of other operations.

Figure 4:
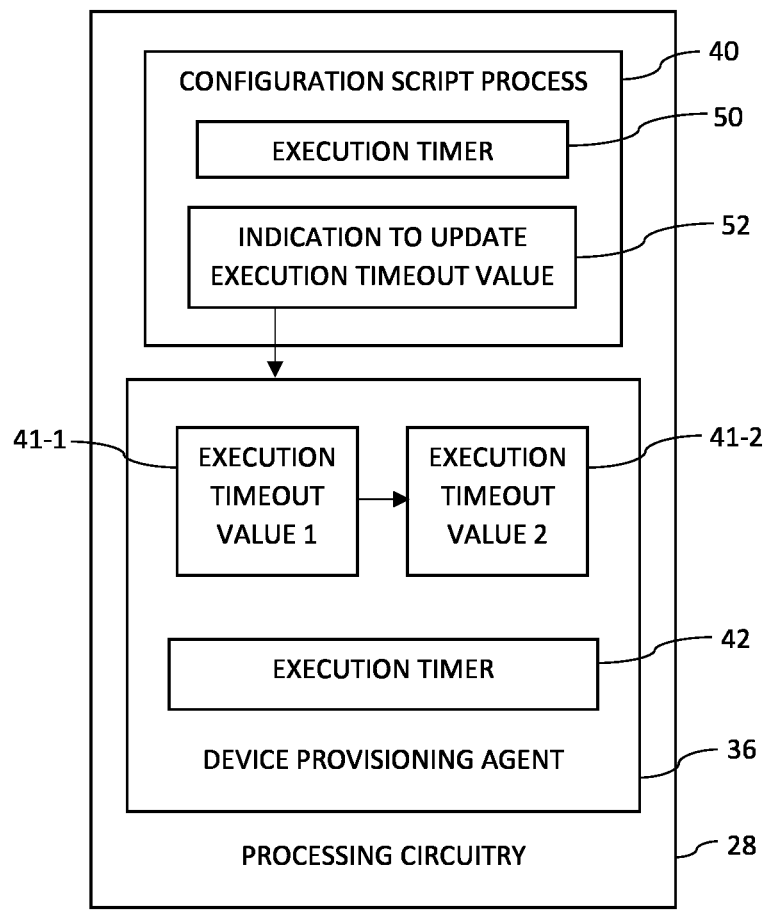
FIG. 4 is a diagram of an illustrative mechanism by which an allocated execution time may be adjusted in accordance with some embodiments.

FIG. 4 is a diagram of an illustrative mechanism by which an execution timeout value indicating an allocated time of executing the corresponding executable file may be adjustable.

In the example of FIG. 4, processing circuitry 28 (in device 10) may execute configuration script 39 (or another type of executable file as described above) in process 40 such as a sub-process of device provisioning process 36. Each executable file (e.g., each configuration script 39) may be executed in a different execution process 40. In one illustrative example, a first (sub-)process 40 may execute a pre-configuration script and may be terminated before a second (sub-)process 40 executes a post-configuration script.

Process 40 may maintain an execution timer 50 (similar to timer 42 maintained by agent 36) indicating an elapsed (amount of) time since the beginning of the execution of the configuration script 39 or generally the execution of the executable file therefor (e.g., since the initiation of process 40). By tracking the elapsed execution time of the executable file is being executed, process 40 may be configured to determine whether or not the execution time of process 40 is approaching the (amount of) time allocated for the completion of the execution of the executable file (e.g., script 39). As an example, process 40 may be aware of (e.g., store or be configured to access) a default execution timeout value used by device provisioning agent 36 (e.g., timeout value 41 described in connection with FIG. 3). Based on the monitoring of the execution timer 50 (e.g., its value approaching the execution timeout value), process 40 may cause device provisioning agent 36 to adjust (e.g., increase) its maintained execution timeout value for process 40.

In particular, to facilitate an adjustment of the execution timeout value maintained by device provisioning agent 36, the executable file (e.g., script 39) may include one or more indications 52 to update the execution timeout value. In some configurations described herein as an illustrative example, indication 52 may include software instructions (code) within the executable file that issue a command to device provisioning agent 36 to cause the change in the maintained execution timeout value. As an example, the issued command (e.g., software instructions in script 39) may be a command line interface command received by agent 36 using a command line interface implemented by processing circuitry 28. The command may include a desired value to which the execution timeout value should be updated (e.g., a value greater than 5 minutes, greater than 10 minutes, greater than 15 minutes, greater than 30 minutes, greater than 1 hour, and/or less than 5 hours, such as a value of 1 hour, 45 minutes, 30 minutes, 15 minutes, 10 minutes, etc.).

In the example of FIG. 4, based on a given indication 52 (e.g., a command issued therefrom), device provisioning agent 36 may update (e.g., increase) the execution timeout value from a first (e.g., default) execution timeout value 41-1 to a second (e.g., script-customized) execution timeout value 41-2. Configurations in which the updated timeout value 41-2 is greater than the original timeout value 41-1 are sometimes described herein as an illustrative example. If desired, in some illustrative applications, the updated timeout value 41-2 may be less than the original timeout value 41-1 (e.g., to ensure that a strict execution time requirement is met).

By providing a mechanism by which process 40 executing the executable file (e.g., configuration script 39) can update the state of the execution timeout value kept by device provisioning agent 36, the adjustability of the allocated execution time may be controllable based on the executable file itself and ultimately by the device owner (e.g., who supplies the executable file). In other words, network device 10 implementing the above-mentioned mechanism may allow any executable file (e.g., any configuration script 39) to customize the execution timeout value based on the needs of that particular executable file.

Indication 52 may be provided in any suitable manner within the executable file such as at any suitable location within script 39. A few (non-limiting) examples are described below for illustrative purposes. In general, configuration script 39 or another type of executable file may include any suitable indication for the adjustment of the execution timeout value.

As a first example, execution of the executable file (e.g., script 39) in process 40 may begin with an adjustment of the execution timeout value. In other words, indication 52 (e.g., a command issued to adjust the execution timeout value maintained at agent 36) may be provided at or near the beginning of the execution of configuration script 39 in process 40.

As a second example, indication(s) 52 (e.g., command(s) issued to adjust the execution timeout value maintained at agent 36) may be provided periodically within the executable file (e.g., script 39). Accordingly, the execution of script 39 may periodically update (e.g., increase) the execution timeout value as execution of configuration script 39 progresses in process 40.

As a third example, indication(s) 52 (e.g., command(s) issued to adjust the execution timeout value maintained at agent 36) may be provided in a conditional manner based on the current elapsed execution time value of execution timer 50. In other words, process 40 may compare the currently elapsed execution time value of timer 50 maintained by process 40 to the known or expected current execution timeout value maintained by agent 36 to determine whether or not to issue a command to adjust the execution timeout value. In particular, if the difference between the currently elapsed execution time value of timer 50 and the current execution timeout value is less than a threshold value (e.g., indicating that agent 36 is about to terminate process 40 due to execution timeout), process 40 may provide indication 52 to device provisioning agent 36 to increase the current execution timeout value maintained at agent 36 and allow for additional time to complete execution of the executable file (e.g., script 39) at process 40. In this manner, process 40 may provide indication 52 to device provisioning agent 36 in a conditional manner (e.g., based on one or more criteria by periodically comparing a value of timer 50 to the known or expected current execution timeout value maintained at agent 36).

These examples are merely illustrative. If desired, a combination of these types of indications 52 and/or other types of indication may be provided in the executable file (e.g., script 39) and usable to adjust the execution timeout value maintained at agent 36 during execution of the executable file (e.g., as part of the execution of script 39, or more specifically, as part of process 40).

In the example of FIG. 4, device provisioning agent 36 may still periodically compare the current value of execution timer 42 to the most current execution timeout value (e.g., value 41-2 after processing the command received based on indication 52, value 41-1 prior to processing the command received based on indication 52, etc.). Upon completion of the execution of the script (e.g., prior to the current elapsed time of timer 50 reaching the current execution timeout value 41-2, and in some instances, after the current elapsed time of timer 52 has exceeded the original execution timeout value 41-1), device provisioning agent 36 may receive an indication of the completion from process 40 and may proceed with a next step of the provisioning process or may conclude the provisioning process, if complete. However, if the execution of the executable file in process 40 has not been completed prior to the current elapsed time reaching the current execution timeout value (e.g., the updated execution timeout value 41-2), processing circuitry 28 may terminate process 40 and restart the provisioning process (e.g., in the same manner as described in connection with FIG. 3).

While device provisioning agent 36 and (sub-)process 40 executing configuration script 39 are described to perform respective parts of the device provisioning operation for provisioning device 10, this is merely illustrative. Processing circuitry 28 may be organized in any suitable manner (e.g., process 40 executing configuration script 39 not necessarily being a sub-process of device provisioning agent 36) to perform the device provisioning operations described in connection FIGS. 3 and 4. Accordingly, processing circuitry 28 may sometimes be described herein to perform the device provisioning operation instead of specifically referring to the one or more agents, (sub-)processes, and/or kernel executed by processing circuitry 28.

Figure 5:
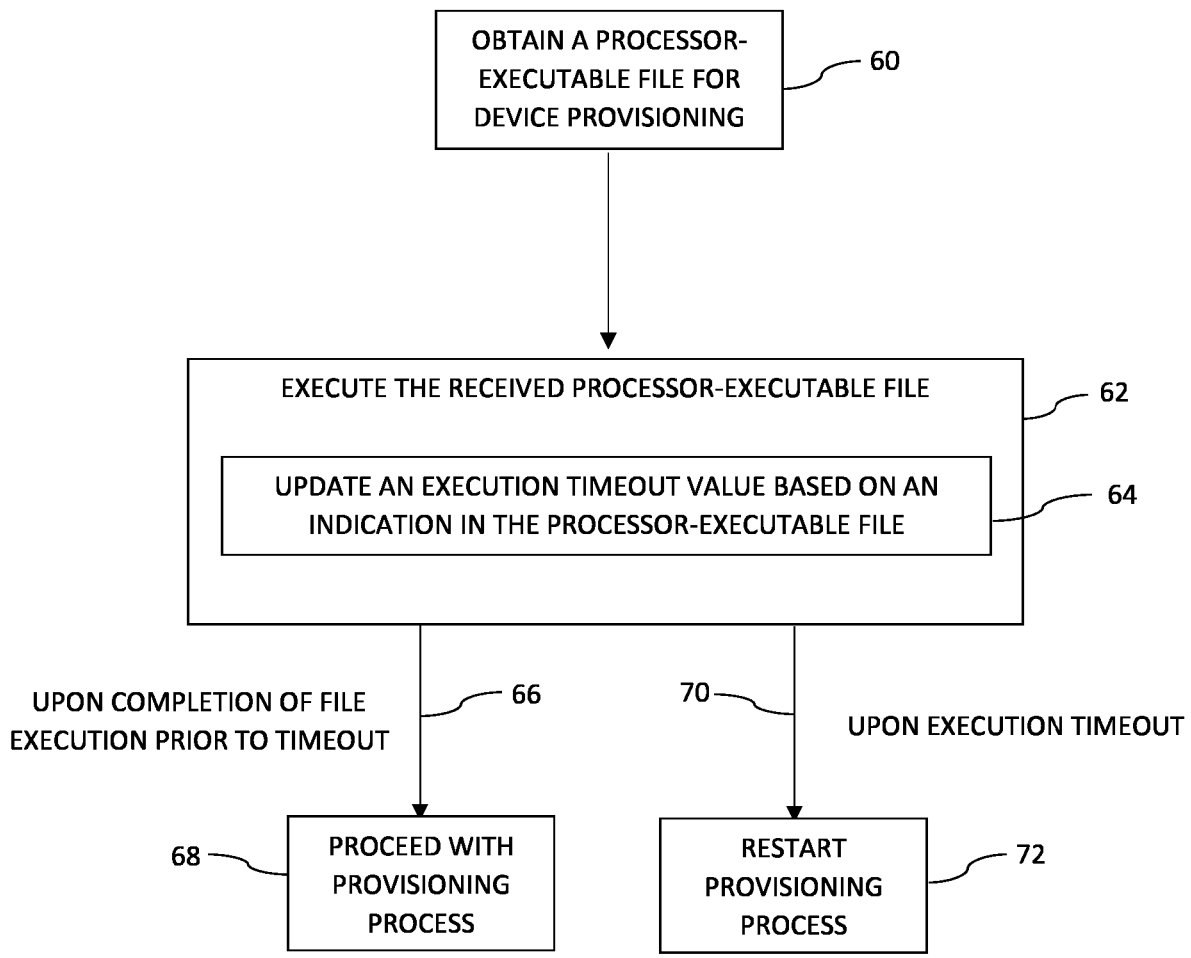
FIG. 5 is a flowchart of illustrative operations for adjusting an execution timeout value in accordance with some embodiments.

FIG. 5 is a flowchart of illustrative operations for adjusting an executable file execution timeout parameter (e.g., an execution timeout value). These operations may be performed at one or more processors of processing circuitry 28 in device 10. The illustrative operations described in connection with FIG. 5 may generally be performed by processing circuitry 28 in device 10 by executing software instructions stored on memory circuitry 30. If desired, one or more operations described in connection with FIG. 5 may be performed by other dedicated hardware components in device 10.

In an illustrative configuration described herein as an example, the operations described in connection with FIG. 5 may be performed by device provisioning agent 36 and (sub-)process 40 executing a given configuration script 39 (or another type of executable file), or generally by processing circuitry 28 on which they are implemented.

At block 60, network device 10 (e.g., device provisioning agent 36 implemented on processing circuitry 28) may obtain a processor-executable file for device (self-)provisioning. As an illustrative example, the processor-executable file may be obtained as part of onboarding information for provisioning network device 10 in preparation for normal networking operations (e.g., performing a network routing operation, a packet forwarding operation, etc.). The executable file or generally the onboarding information may be initially received in a signed, encrypted, and/or generally encoded form and device provisioning agent 36 may validate, decrypt, and/or generally decode the received version of the onboarding information to obtain the executable file in an executable form. In some instances, the obtained executable file may be a compiled binary executable file directly executable by processing circuitry 28. In other instances, the obtained executable file may be an executable script that is translatable into machine code prior to being directly executable by processing circuitry 28.

At block 62, network device 10 (e.g., process 40 implemented on processing circuitry 28) may execute the obtained processor-executable file. As an example, processing circuitry 28 may initiate process 40 for executing the executable file, which may be a sub-process of device provisioning agent 36.

At block 64 (e.g., as part of executing the obtained executable file at block 62), network device 10 (e.g., process 40 implemented on processing circuitry 28) may update an execution timeout value (e.g., maintained by device provisioning agent 36) based on an indication in the executable file being executed at process 40. As an example, as part of executing the executable file, process 40 may issue a command (e.g., a command line interface command) to agent 36 to update the state of the execution timeout value from a default value to a command-defined value (e.g., greater than the default value).

If desired, the execution timeout value maintained by agent 36 may be updated multiple times during the execution of the executable file at process 40, each update being based on a corresponding command (or indication) issued as part of the execution of the executable file at process 40. In other words, multiple instances of block 64 (e.g., the operations therein) may occur within block 62.

Upon completion of the execution of the executable file by process 40, processing may proceed via path 66 to block 68. At block 68, network device 10 (e.g., device provisioning agent 36 implemented on processing circuitry 28) may proceed with a next step in the provisioning process or conclude the provisioning process, if completed. In particular, process 40 may convey information to device provisioning agent 36 indicative of the completion of execution of the executable file. This conveyance of information may occur prior to timeout (e.g., prior to the elapsed execution time exceeding the most current execution timeout value determined based on the most recent performance of the operations at block 64).

Upon execution timeout by process 40 as determined by device provisioning agent 36, processing may proceed via path 70 to block 72. At block 72, network device 10 (e.g., device provisioning agent 36 implemented on processing circuitry 28) may restart the provisioning process. In particular, device provisioning agent 36 may determine that the currently elapsed execution time has exceeded the maintained execution timeout to determine that execution timeout has occurred.

The operations described in connection with FIG. 5 are merely illustrative. If desired, one or more of these operations may be omitted and/or changed. If desired, one or more additional operations may be performed as part of each of the operations described in connection with FIG. 5. If desired, some operations described in connection with FIG. 5 may be performed in parallel with each other (e.g., across multiple components such as across multiple processors of device 10) and/or some operations described in connection with FIG. 5 may be performed sequentially (e.g., at only a single component such as at a processor of network device 10).

Figure 6:
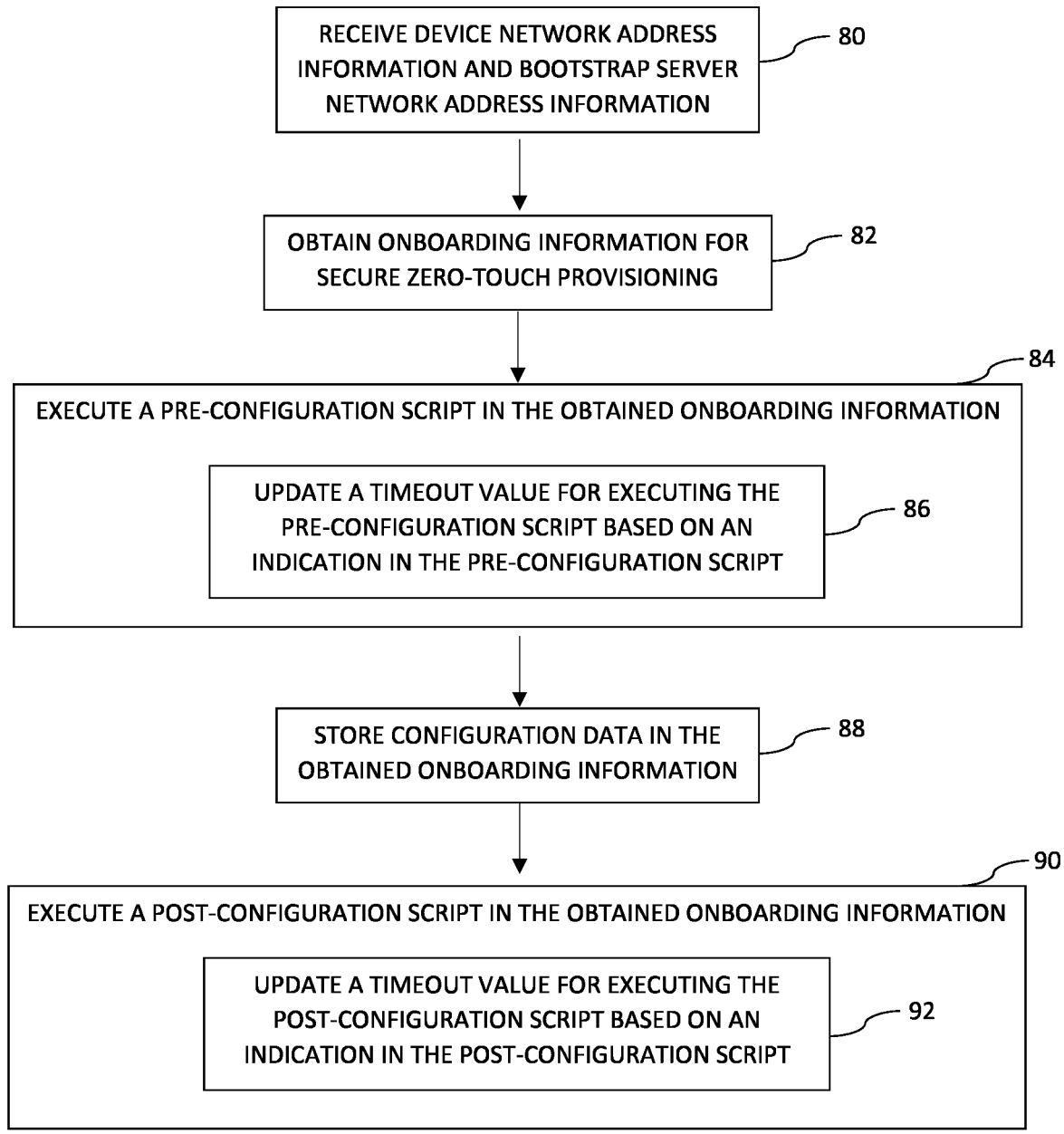
FIG. 6 is a flowchart of illustrative operations for performing secure zero touch provisioning at a network device in accordance with some embodiments.

FIG. 6 is a flowchart of illustrative operations for performing secure zero touch provisioning at a network device. These operations may be performed at one or more processors of processing circuitry 28 in device 10. The illustrative operations described in connection with FIG. 6 may generally be performed by processing circuitry 28 in device 10 by executing software instructions stored on memory circuitry 30. If desired, one or more operations described in connection with FIG. 6 may be performed by other dedicated hardware components in device 10.

In an illustrative configuration described herein as an example, the operations described in connection with FIG. 6 may be performed by device provisioning agent 36, (sub-) processes 40 each executing a corresponding configuration script 39 (or another type of executable file), and kernel 38, or generally processing circuitry 28 on which they are implemented.

At block 80, network device 10 (e.g., device provisioning agent 36 implemented on processing circuitry 28) may receive device network address information and bootstrap server network address information. As an example, device provisioning agent 36 may communicate with a DHCP server to obtain the device network address information and bootstrap server network address information. If desired, device provisioning agent 36 may receive bootstrap server network address information as part of redirect information obtained from another source of bootstrapping data.

At block 82, network device 10 (e.g., device provisioning agent 36 implemented on processing circuitry 28) may obtain onboarding information (e.g., an artifact for secure zero touch provisioning) containing a boot image, a pre-configuration script, configuration data (e.g., indicative of an initial configuration for network device 10), and/or a post-configuration script. Along with the onboarding information artifact, network device 10 (e.g., device provisioning agent 36) may also obtain an owner certificate artifact and an ownership voucher artifact. In scenarios in which the received version of the onboarding information is signed (e.g., by an owner key or certificate), device provisioning agent 36 may use the owner certificate and the ownership voucher to validate the signed onboarding information. If desired, one or both of the pre-configuration and post-configuration scripts may be other types of processor-executable configuration files (e.g., compiled binary executable files) instead of script-based executable files.

At block 84, network device 10 (e.g., a first process 40 implemented on processing circuitry 28) may execute a pre-configuration script in the obtained onboarding information. As an example, processing circuitry 28 may initiate the first process 40 for executing the pre-configuration script, which may be a sub-process of device provisioning agent 36.

At block 86 (e.g., as part of executing the pre-configuration script at block 84), network device 10 (e.g., the first process 40 implemented on processing circuitry 28) may update an execution timeout value for executing the pre-configuration script (e.g., maintained by device provisioning agent or process 36) based on an indication in the pre-configuration script being executed at the first process 40. As an example, as part of executing the pre-configuration script, the first process 40 may issue a command (e.g., a command line interface command) to agent 36 to update the state of the execution timeout value for executing the pre-configuration script from a default value to a script-defined (e.g., command-defined) value.

If desired, the execution timeout value for executing the pre-configuration script maintained by agent 36 may be updated multiple times during the execution of the pre-configuration script at the first process 40, each update being based on a corresponding command (or indication) issued as part of the execution of the pre-configuration script at the first process 40. In other words, multiple instances of block 86 (e.g., the operations therein) may occur within block 84.

At block 88, network device 10 (e.g., device provisioning agent 36 implemented on processing circuitry 28) may store configuration data in the obtained onboarding information on memory circuitry 30. The configuration data may contain information for or indicative of an initial configuration of network device 10. In other words, once device self-provisioning has been successfully completed, provisioned network device 10 may upon start-up use the stored initial configuration to perform networking functions.

At block 90, network device 10 (e.g., a second process 40 implemented on processing circuitry 28) may execute a post-configuration script in the obtained onboarding information. As an example, processing circuitry 28 may initiate the second process 40 for executing the post-configuration script, which may be a sub-process of device provisioning agent 36.

At block 92 (e.g., as part of executing the post-configuration script at block 90), network device 10 (e.g., the second process 40 implemented on processing circuitry 28) may update an execution timeout value for executing the post-configuration script (e.g., maintained by device provisioning agent or process 36) based on an indication in the post-configuration script being executed at the second process 40. As an example, as part of executing the post-configuration script, the second process 40 may issue a command (e.g., a command line interface command) to agent 36 to update the state of the execution timeout value for executing the post-configuration script from a default value to a script-defined (e.g., command-defined) value.

If desired, the execution timeout value for executing the post-configuration script maintained by agent 36 may be updated multiple times during the execution of the post-configuration script at the second process 40, each update being based on a corresponding command (or indication) issued as part of the execution of the post-configuration script at the second process 40. In other words, multiple instances of block 92 (e.g., the operations therein) may occur within block 90.

In some configurations described herein as an illustrative example, the operations described in connection with block 88 may be performed after the operations described in connection with block 84 has been successfully completed (e.g., the execution of the pre-configuration script has been successfully completed) and/or the operations described in connection with block 90 may be performed after the operations described in connection with block 88 has been successfully completed (e.g., after the configuration data has been successfully installed in memory circuitry 30). If desired, if any of the operations described in connection with blocks 84, 88, and 90 are not successfully completed, device 10 (e.g., device provisioning agent 36 implemented on processing circuitry 28) may restart the provisioning process by re-performing the operations described in connection with block 80 (and reverting to a previous bootstrap state of the network device prior to re-performing the operations described in connection with block 80).

The operations described in connection with FIG. 6 are merely illustrative. If desired, one or more of these operations may be omitted and/or changed. If desired, one or more additional operations may be performed as part of each of the operations described in connection with FIG. 6. If desired, some operations described in connection with FIG. 6 may be performed in parallel with each other (e.g., across multiple components such as across multiple processors of device 10) and/or some operations described in connection with FIG. 6 may be performed sequentially (e.g., at only a single component such as at a processor of network device 10).

The methods and operations described above in connection with FIGS. 1-6 may be performed by the components of one or more network devices and/or server or other host equipment using software, firmware, and/or hardware (e.g., dedicated circuitry or hardware). Software code for performing these operations may be stored on one or more non-transitory computer-readable storage media (e.g., tangible computer readable storage media) on one or more of the components of the network device(s) and/or server or other host equipment. The software code may sometimes be referred to as software, data, instructions, program instructions, or code. The non-transitory computer-readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device(s) and/or server or other host equipment (e.g., processing circuitry 28 in network device 10, processing circuitry on router 12, processing circuitry on server equipment 14, etc.).

The foregoing is merely illustrative and various modifications can be made to the described embodiments. The foregoing embodiments may be implemented individually or in any combination.

What is claimed is:

1. A method for network device provisioning, the method comprising:
   securely obtaining, by a network device, onboarding information that includes a processor-executable file;
   executing, by the network device, the processor-executable file;
   maintaining, by the network device, a timeout value indicating an allocated time to complete the execution of the processor-executable file; and
   updating, by the network device, the timeout value based on an indication in the processor-executable file.

2. The method defined in claim 1, wherein the onboarding information includes configuration data indicative of an initial configuration for the network device, the method further comprising:
   storing, by the network device, the configuration data; and
   operating, by the network device, using the initial configuration after completing network device provisioning.

3. The method defined in claim 2, wherein storing the configuration data occurs after executing the processor-executable file.

4. The method defined in claim 2, wherein storing the configuration data occurs before executing the processor-executable file.

5. The method defined in claim 1, wherein securely obtaining the onboarding information comprises:
   obtaining a version of the onboarding information that is signed, encrypted, or signed and encrypted;
   validating the version of the onboarding information if the version of the onboarding information is signed; and
   decrypting the version of the onboarding information if the version of the onboarding information is encrypted.

6. The method defined in claim 5 further comprising:
   obtaining, by the network device, an ownership voucher and an owner certificate;
   authenticating, by the network device, the ownership voucher to extract a certificate; and
   validating, by the network device, an owner certificate based on the extracted certificate, wherein the owner certificate is used to sign the onboarding information and wherein validating the version of the onboarding information comprises verifying that the version of the onboarding information is signed by the validated owner certificate.

7. The method defined in claim 1, wherein securely obtaining the onboarding information comprises obtaining, by the network device, the onboarding information from a bootstrap server trusted by the network device.

8. The method defined in claim 7, where the bootstrap server is trusted by the network device based on a list of trusted bootstrap servers maintained at the network device or based on a list of trust anchor certificates for bootstrap servers maintained at the network device.

9. The method defined in claim 1, wherein updating the timeout value based on the indication in the processor-executable file occurs while executing the processor-executable file.

10. The method defined in claim 9, wherein the indication in the processor-executable file causes a command line interface command to update the timeout value.

11. The method defined in claim 1 further comprising:
    maintaining, by the network device, a timer indicating an elapsed time for executing the processor-executable file; and
    restarting, by the network device, network device provisioning based on a comparison of the timer to the updated timeout value.

12. The method defined in claim 11 further comprising:
    periodically comparing, by the network device, the timer to the updated timeout value, wherein the comparison of the timer to the updated timeout value, based on which network device provisioning is restarted, is indicative of the elapsed time exceeding the allocated time.

13. One or more non-transitory computer-readable storage media comprising computer-executable instructions that, when executed by one or more processors in a network device, cause the one or more processors to:
    obtain provisioning information that includes a pre-configuration script, configuration data, and a post-configuration script;
    execute the pre-configuration script;
    store the configuration data;
    execute the post-configuration script; and
    update an execution timeout value for at least one of the pre-configuration script or the post-configuration script based on a command issued by the one of the pre-configuration script or the post-configuration script.

14. The one or more non-transitory computer-readable storage media defined in claim 13 further comprising computer-executable instructions that, when executed by the one or more processors, cause the one or more processors to:
    complete the execution of the one of the pre-configuration script or the post-configuration script prior to a time indicated by the updated execution timeout value and after a time indicated by the execution timeout value before being updated, wherein the execution timeout value is updated while the one of the pre-configuration script or the post-configuration script is being executed.

15. The one or more non-transitory computer-readable storage media defined in claim 13, wherein the command is issued by the one of the pre-configuration script or the post-configuration script based on an elapsed time for executing the one of the pre-configuration script or the post-configuration script.

16. The one or more non-transitory computer-readable storage media defined in claim 13 further comprising computer-executable instructions that, when executed by the one or more processors, cause the one or more processors to:
    update an additional execution timeout value for the other one of the pre-configuration script or the post-configuration script based on an additional command issued by the other one of the pre-configuration script or the post-configuration script.

17. An un-provisioned network device configured to perform secure zero touch provisioning, the un-provisioned network device comprising:
    a packet processor;
    memory circuitry; and
    processing circuitry coupled to the memory circuitry and the packet processor and configured to perform secure zero touch provisioning by:
       obtaining bootstrapping data that includes an executable file executable by the processing circuitry;
       executing the executable file;
       maintaining an execution timeout value indicating an allocated time to complete the execution of the executable file; and
       updating the execution timeout value based on an indication in the executable file.

18. The un-provisioned network device defined in claim 17, wherein the obtained bootstrapping data includes onboarding information containing the executable file and includes an ownership voucher and an owner certificate.

19. The un-provisioned network device defined in claim 18, wherein the onboarding information contains configuration data and a post-configuration script and wherein the executable file is a pre-configuration script in the onboarding information.

20. The un-provisioned network device defined in claim 18, wherein the onboarding information contains configuration data and a pre-configuration script and wherein the executable file is a post-configuration script in the onboarding information.

* * * * *